United States Patent
Okada et al.

(10) Patent No.: US 10,416,403 B2
(45) Date of Patent: Sep. 17, 2019

(54) OPTICAL FIBER CABLE

(71) Applicant: SUMITOMO ELECTRIC INDUSTRIES, LTD., Osaka-shi, Osaka (JP)

(72) Inventors: Keisuke Okada, Yokohama (JP); Fumiaki Sato, Yokohama (JP); Yoshiaki Nagao, Yokohama (JP); Nobuyuki Suzuki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/075,803

(22) PCT Filed: Feb. 8, 2017

(86) PCT No.: PCT/JP2017/004614
§ 371 (c)(1),
(2) Date: Aug. 6, 2018

(87) PCT Pub. No.: WO2017/138572
PCT Pub. Date: Aug. 17, 2017

(65) Prior Publication Data
US 2019/0064462 A1    Feb. 28, 2019

(30) Foreign Application Priority Data

Feb. 8, 2016    (JP) .................. 2016-021723

(51) Int. Cl.
*G02B 6/44* (2006.01)

(52) U.S. Cl.
CPC ............. *G02B 6/4434* (2013.01); *G02B 6/44* (2013.01); *G02B 6/4403* (2013.01); *G02B 6/443* (2013.01)

(58) Field of Classification Search
CPC .... G02B 6/4434; G02B 6/443; G02B 6/4403; G02B 6/4404; G02B 6/4407;
(Continued)

(56) References Cited

U.S. PATENT DOCUMENTS 6,122,426 A * 9/2000 Ishikawa .............. G02B 6/4489
                                                           385/104
6,901,196 B2 * 5/2005 Takahashi ............. C03C 13/047
                                                           385/114
(Continued)

FOREIGN PATENT DOCUMENTS

JP    H08-262296 A    10/1996
JP    2012-42354 A    3/2012
(Continued)

OTHER PUBLICATIONS

Fumiaki Sato et al., "Ultra-High-Fiber-Count and High-Density Slotted Core Cable with Pliable 12-Fiber Ribbons," SEI Technical Review, Oct. 2016, pp. 10-14, No. 83.

*Primary Examiner* — John Bedtelyon
(74) *Attorney, Agent, or Firm* — Drinker Biddle & Reath LLP

(57) ABSTRACT

An optical fiber cable includes optical fiber ribbons of no less than 12, a slot rod including slot grooves in which the optical fiber ribbons are housed, a tension member, and a cable sheath. The optical fiber ribbons include, at a part of or through all of the optical fiber core wires, in a state where the optical fiber core wires are arranged in parallel, a connecting part where adjacent optical fiber core wires are connected and a non-connecting part where adjacent optical fiber core wires are not connected, which are provided intermittently in a longitudinal direction. A relationship between the number "x" of the optical fiber core wires housed in the optical fiber cable and flexural rigidity "y"
(Continued)

(N·mm²) of the optical fiber cable satisfies following Expression 1.

$$y \leq 3e^{0.0006x} \qquad \text{(Expression 1)}$$

1 Claim, 4 Drawing Sheets

(58) Field of Classification Search
CPC .. G02B 6/4408; G02B 6/4409; G02B 6/4429; G02B 6/4432
See application file for complete search history.

(56) References Cited

U.S. PATENT DOCUMENTS

| | | | | |
|---|---|---|---|---|
| 8,548,294 | B2* | 10/2013 | Toge | G02B 6/4403 385/114 |
| 2004/0218851 | A1* | 11/2004 | Izumitani | G02B 6/02033 385/15 |
| 2012/0189257 | A1* | 7/2012 | Kasahara | C03C 25/106 385/114 |
| 2018/0314020 | A1* | 11/2018 | Sato | G02B 6/44 |
| 2018/0321453 | A1* | 11/2018 | Sato | G02B 6/44 |
| 2018/0321454 | A1* | 11/2018 | Sato | G02B 6/44 |

FOREIGN PATENT DOCUMENTS

| | | | |
|---|---|---|---|
| JP | 2015-7714 | A | 1/2015 |
| JP | 2016-20989 | A | 2/2016 |

* cited by examiner

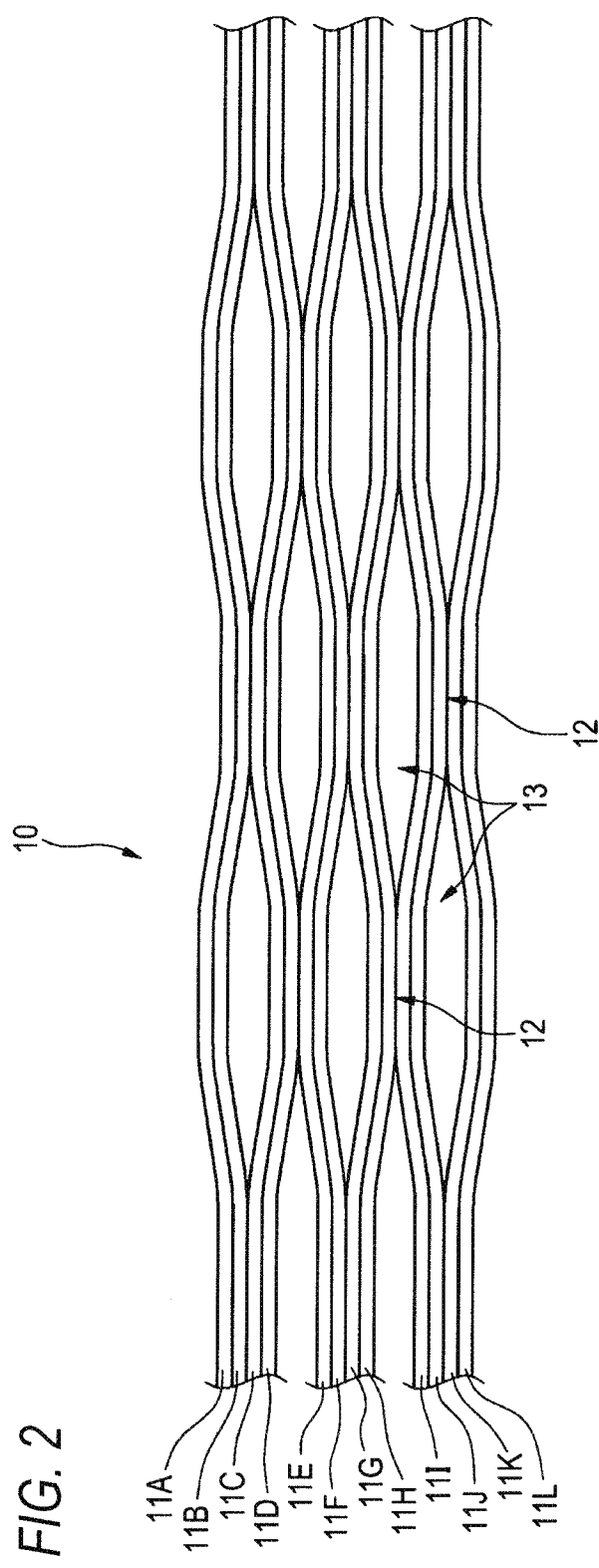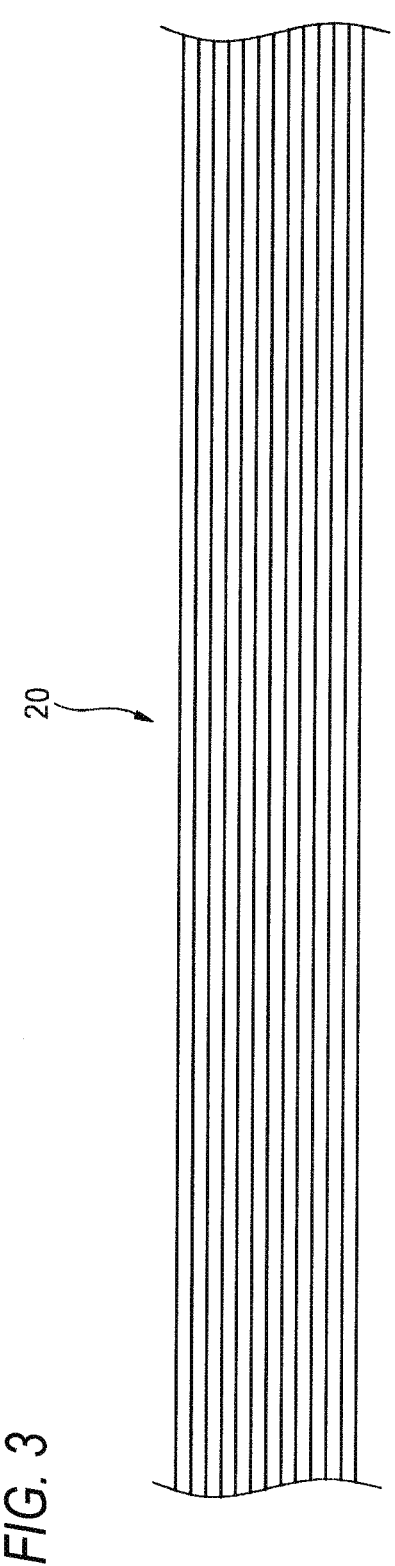
FIG. 2
FIG. 3

◆ : OPTICAL FIBER CABLE 21 IN WHICH NON-INTERMITTENT OPTICAL FIBER RIBBONS 20 ARE USED
■ : OPTICAL FIBER CABLE 1 IN WHICH INTERMITTENT-CONNECTION-TYPE OPTICAL FIBER RIBBONS 10 ARE USED

OPTICAL FIBER CABLE

TECHNICAL FIELD

The present invention relates to an optical fiber cable.

This application claims priority from Japanese Patent Application No. 2016-021723, filed on Feb. 8, 2016, the entire subject matter of which is incorporated herein by reference.

BACKGROUND ART

Patent Document 1 discloses an optical fiber cable in which ribbons integrally covered with a covering body are, in a state where a plurality of optical fiber wires are arranged in parallel, laminated and housed separately in grooves which are formed in a plurality of portions in an outer circumferential surface of a slot rod, in which a tension member is arranged in a center of the slot rod, and in which a protective sheath is further provided on a surface of the slot rod in a state of closing the grooves.

CITATION LIST

Patent Document

Patent Document 1: JP-A-H08-262296

SUMMARY OF INVENTION

An optical fiber cable according to an aspect of the present disclosure includes:

a plurality of optical fiber ribbons of no less than twelve optical fiber core wires;

a slot rod that includes a plurality of slot grooves in which the plurality of optical fiber ribbons are housed;

a tension member that is provided inside the slot rod; and a cable sheath that covers outside the slot rod, wherein the optical fiber ribbons include, at a part of or through all of the plurality of optical fiber core wires, in a state where the plurality of optical fiber core wires are arranged in parallel, a connecting part where adjacent optical fiber core wires are connected to each other and a non-connecting part where adjacent optical fiber core wires are not connected to each other, the connecting part and the non-connecting part being provided intermittently in a longitudinal direction, and wherein a relationship between the number "x" of the optical fiber core wires housed in the optical fiber cable and flexural rigidity "y" (N·mm$^2$) of the optical fiber cable satisfies following Expression 1.

$$y \leq 3e^{0.0006x} \quad \text{(Expression 1)}$$

BRIEF DESCRIPTION OF DRAWINGS

FIG. 2 is a plan view illustrating intermittent-connection-type optical fiber ribbons with twelve optical fiber core wires.

FIG. 3 is a plan view illustrating normal optical fiber ribbons (non-intermittent optical fiber ribbons) with twelve optical fiber core wires.

DESCRIPTION OF EMBODIMENTS

Problems to be Solved by Disclosure

Figure 1:
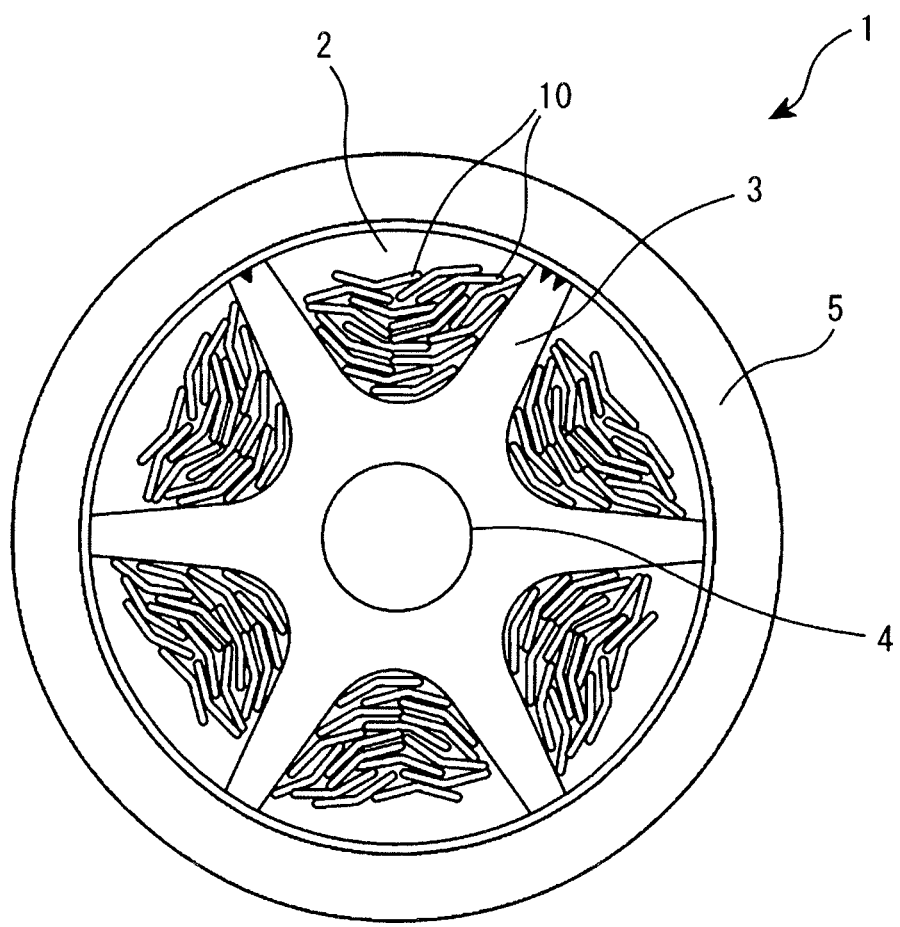
FIG. 1 is a sectional view illustrating an example of an optical fiber cable according to an embodiment of the present disclosure.

In a slot-type optical fiber cable, a position of an optical fiber ribbon inside a slot groove changes when an external force such as bending is applied to the cable. At this time, transmission characteristics deteriorate when the optical fiber ribbon comes into contact with a wall of a slot rod, a cable sheath, and the like. Particularly, multiple optical fiber ribbons, such as twelve optical fiber core wires, are more likely to come into contact with the wall of a slot rod, the cable sheath, and the like due to a large width thereof, making the transmission characteristics deteriorate significantly. Therefore, when multiple optical fiber ribbons are housed in a slot groove, it is necessary to enlarge the slot groove so that the optical fiber ribbons do not come into contact with the wall of a slot rod, the cable sheath, and the like, so as to ensure predetermined transmission characteristics. Accordingly, an outer diameter of the cable increases when the slot groove is enlarged and flexural rigidity of the optical fiber cable is thus increased, making the cable difficult to bend. For example, it is difficult to handle the cable inside such as a duct, a manhole, and a hand hole. Therefore, for example, in Patent Document 1, flexibility is improved by narrowing a tension member or reducing Young's modulus of a protective sheath.

An object of the present disclosure is to provide an optical fiber cable in which an increase in flexural rigidity of the optical fiber cable can be suppressed even when multiple optical fiber ribbons are used.

Effect of Disclosure

According to the present disclosure, the increase in flexural rigidity of the optical fiber cable can be suppressed even when multiple optical fiber ribbons are used.

Description of Embodiments of Invention

First, embodiments of the present invention are listed and described.

An optical fiber cable according to an embodiment of the present invention includes:

(1) a plurality of optical fiber ribbons of no less than twelve optical fiber core wires;

a slot rod that includes a plurality of slot grooves in which the plurality of optical fiber ribbons are housed;

a tension member that is provided inside the slot rod; and a cable sheath that covers outside the slot rod, wherein the optical fiber ribbons include at a part of or through all of the plurality of optical fiber core wires, in a state where the plurality of optical fiber core wires are arranged in parallel, a connecting part where adjacent optical fiber core wires are connected to each other and a non-connecting part where adjacent optical fiber core wires are not connected to each other, the connecting part and the non-connecting part being provided intermittently in a longitudinal direction, and wherein a relationship between the number "x" of the optical fiber core wires housed in the optical fiber cable and flexural rigidity "y" (N·mm²) of the optical fiber cable satisfies following Expression 1.

$$y \leq 3e^{0.0006x} \quad \text{(Expression 1)}$$

Since an intermittently connected structure is formed between a part or all of the plurality of optical fiber core wires in the longitudinal direction, the plurality of the optical fiber ribbons of no less than twelve optical fiber core wires housed in the slot grooves have flexibility. In this way, an increase in flexural rigidity of the optical fiber cable can be suppressed even when the number of the optical fiber core wires housed in the optical fiber cable is increased. Further, strain generated in the optical fiber ribbons can be reduced when the optical fiber cable is bent, and a large gap may be not provided in the slot grooves. Therefore, an outer diameter of the optical fiber cable can be made smaller than that of an optical fiber cable in which normal optical fiber ribbons are used even when the numbers of optical fiber ribbons are the same, and the increase in flexural rigidity of the optical fiber cable can be further suppressed.

DETAILS OF EMBODIMENTS

Specific examples of an optical fiber cable according to an embodiment of the present invention are described with reference to drawings hereinafter.

Additionally, the present invention is not limited to these examples but indicated by the scope of claims, and is intended to include meanings equivalent to the scope of claims and all modifications within the scope.

FIG. 1 is a sectional view illustrating an example of the optical fiber cable according to the present embodiment. FIG. 2 is a plan view illustrating intermittent-connection-type optical fiber ribbons with twelve optical fiber core wires.

As illustrated in FIG. 1, an optical fiber cable 1 includes a plurality of optical fiber ribbons 10 of no less than twelve optical fiber core wires, a slot rod 3 which includes a plurality of slot grooves 2 in which the plurality of optical fiber ribbons 10 are housed, a tension member 4 which is provided inside the slot rod 3, and a cable sheath 5 which covers outside the slot rod 3.

The slot rod 3 is configured such that the plurality of slot grooves 2 (six in FIG. 1) are provided radially around the tension member 4 by stranding in one direction on an outer side of the slot rod 3 or by SZ stranding on an outer side of the slot rod 3.

As an example of the optical fiber ribbons 10 housed in the slot grooves 2, optical fiber ribbons 10 with twelve optical fiber core wires are illustrated in FIG. 2. In the optical fiber ribbons 10 illustrated in FIG. 2, twelve optical fiber core wires 11A to 11L are arranged in parallel. These optical fiber core wires 11A to 11L are single coated optical fibers. Additionally, coatings of the optical fiber core wires 11A to 11L may be colored in different colors so that the optical fiber core wires can be identified with each other.

The optical fiber ribbons 10 are intermittently connected and include, in a state where a plurality of optical fiber core wires are arranged in parallel, a connecting part 12 where adjacent optical fiber core wires are connected to each other and a non-connecting part 13 where adjacent optical fiber core wires are not connected to each other, and the connecting part 12 and the non-connecting part 13 are provided intermittently in a longitudinal direction. Accordingly, a portion where the connecting part 12 and the non-connecting part 13 are intermittently provided may be at a part of the optical fiber core wires as illustrated in FIG. 2, or through all the optical fiber core wires. In FIG. 2, the non-connecting part 13 is not provided between the optical fiber core wires 11A and 11B, 11C and 11D, 11E and 11F, 11G and 11H, 11I and 11J, and 11K and 11L.

The optical fiber ribbons 10 may be produced, for example, by applying intermittently a connecting resin such as an ultraviolet-curable resin or a thermosetting resin between the optical fiber core wires so that the connecting part 12 and the non-connecting part 13 are formed intermittently. Alternatively, the intermittent-connection-type optical fiber ribbons 10 may also be produced by applying a connecting resin to the plurality of optical fiber core wires 11A to 11L to connect all the optical fiber core wires, and cutting a part of the optical fiber core wires by using such as a rotary blade to form the non-connecting part 13.

Additionally, the connecting resin may also be a resin having good releasability in order to facilitate separating an optical fiber core wire from the optical fiber core wires.

The inventors investigated, by using the above intermittent-connection-type optical fiber ribbons 10 to the optical fiber cable 1, to what degree an increase in flexural rigidity of the optical fiber cable 1 can be suppressed when the number of the optical fiber core wires is increased. For this purpose, the inventors compared the optical fiber cable 1 with normal optical fiber ribbons in which all optical fiber core wires are connected to each other without a non-connecting part (referred to as "non-intermittent optical fiber ribbons" hereinafter), in terms of an increase in flexural rigidity corresponding to an increase in the number of optical fiber core wires in each optical fiber cable.

Figure 4:
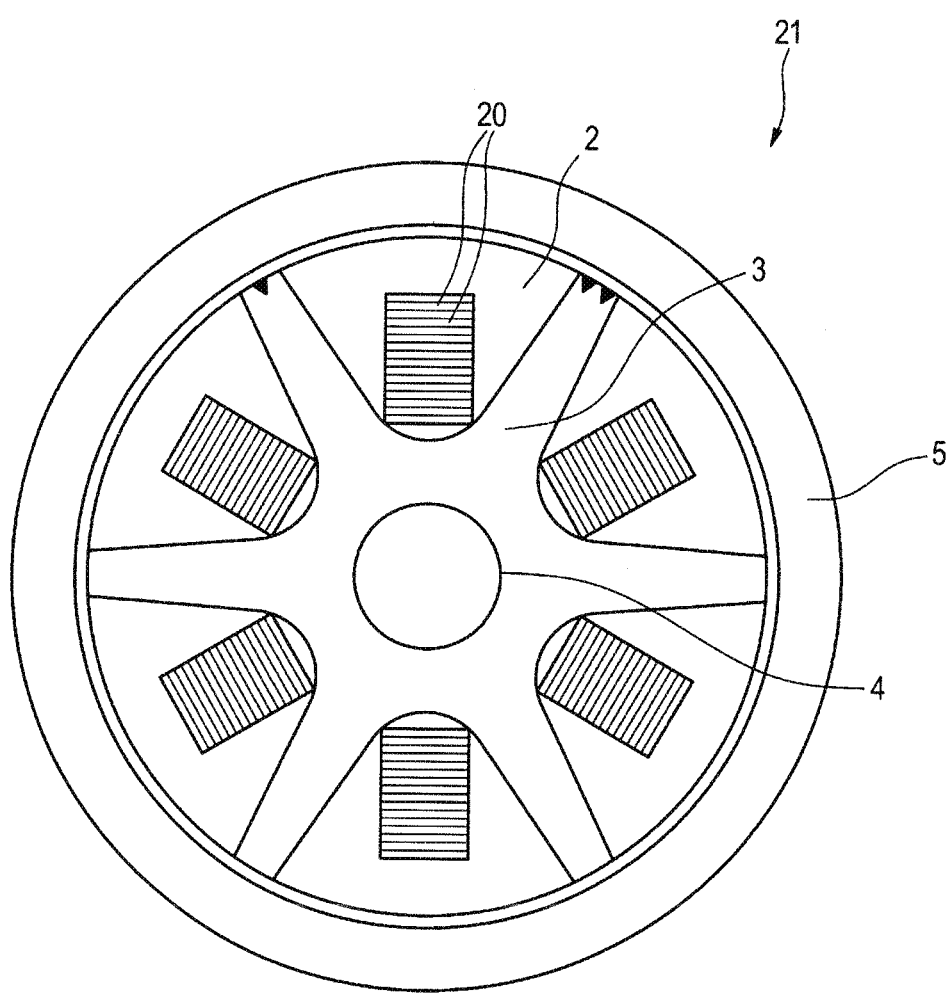
FIG. 4 is a sectional view of an optical fiber cable according to a comparative example in which the non-intermittent optical fiber ribbons in FIG. 3 are used.

FIG. 3 is a plan view illustrating non-intermittent optical fiber ribbons 20 with twelve optical fiber core wires. FIG. 4 illustrates an optical fiber cable 21 according to a comparative example in which the non-intermittent optical fiber ribbons 20 in FIG. 3 are used.

In regard to the optical fiber cable 21 according to the comparative example in FIG. 4 in which the non-intermittent optical fiber ribbons 20 in FIG. 3 are used and the optical fiber cable 1 (see FIG. 1) according to the present embodiment in which the intermittent-connection-type optical fiber ribbons 10 are used, the inventors changed the number of optical fiber core wires housed in these cables and calculated flexural rigidity of these cables separately. Here, the optical fiber cable 21 according to the comparative example is the similar structure to the optical fiber cable 1 except that the housed optical fiber ribbons are different.

Figure 5:
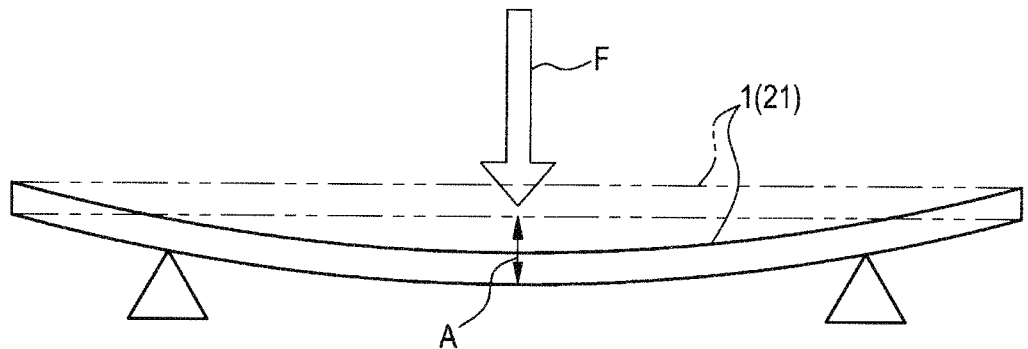
FIG. 5 is a schematic view illustrating a method for measuring flexural rigidity.

First, a method for calculating flexural rigidity is described. As illustrated in FIG. 5, the optical fiber cables 1 and 21 are held at two points, and an external force F in a direction orthogonal to a cable longitudinal direction is applied to central parts of the optical fiber cables 1 and 21 to measure displacement A. The flexural rigidity is then calculated based on the measured value of the displacement A.

Figure 6:
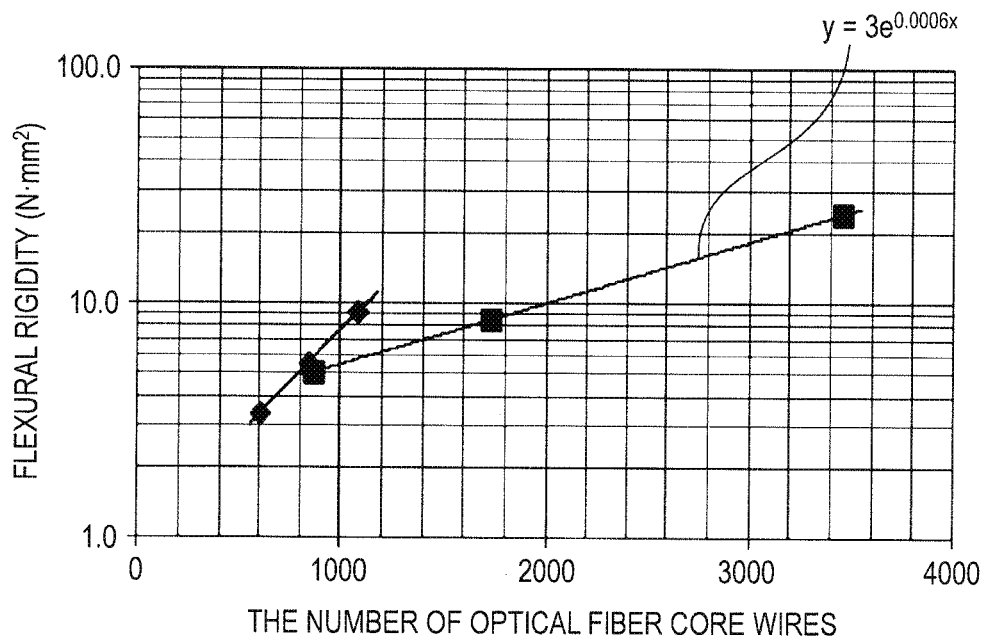
FIG. 6 is a graph comparing an optical fiber cable in which the optical fiber ribbons in FIG. 2 are used with an optical fiber cable in which the optical fiber ribbons in FIG. 3 are used, in terms of a relationship between the number of optical fiber core wires and flexural rigidity in each optical fiber cable.

Calculation results are illustrated in FIG. 6. As illustrated in FIG. 6, in a case of the optical fiber cable 21 in which the non-intermittent optical fiber ribbons 20 are used, flexural rigidity increases exponentially as the number of the optical fiber core wires increases.

In contrast, in a case of the optical fiber cable 1 according to the present embodiment in which the intermittent-connection-type optical fiber ribbons 10 are used, flexural rigidity also increases as the number of the optical fiber core wires increases. However, it is seen that the increase in flexural rigidity in the case of the optical fiber cable 1 is suppressed further than that in the case of the optical fiber cable 21 in which the non-intermittent optical fiber ribbons 20 are used. Particularly, effect of suppressing the increase in flexural rigidity is increased when the number of the optical fiber core wires exceeds 864.

In the optical fiber cable 1 according to the present embodiment in which the intermittent-connection-type optical fiber ribbons 10 are used, a relationship between the number "x" of the optical fiber core wires housed therein and the flexural rigidity "y" (n·mm$^2$) of the optical fiber cable satisfies following Expression 1.

$$y \leq 3e^{0.0006x} \quad \text{(Expression 1)}$$

That is, the optical fiber cable 1 according to the present embodiment is an optical fiber cable in which the relationship between the number "x" of the housed optical fiber core wires and the flexural rigidity "y" (N·mm$^2$) of the optical fiber cable satisfies the above Expression 1. Particularly, the optical fiber cable 1 according to the present embodiment has a significant effect of suppressing the increase in flexural rigidity when the optical fiber cable includes multiple optical fiber core wires of no less than 864.

As described above in detail, according to the optical fiber cable 1 according to the present embodiment, the plurality of optical fiber ribbons 10 of no less than twelve optical fiber core wires housed in the slot grooves 2 have flexibility since an intermittently connected structure is formed at a part of or through all of the optical fiber core wires in the longitudinal direction. Therefore, the increase in flexural rigidity of the optical fiber cable 1 can be suppressed even when the number of the optical fiber core wires housed in the optical fiber cable 1 is increased. Further, strain generated in the optical fiber ribbons 10 can be reduced when the optical fiber cable 1 is bent, and a large gap may be not provided in the slot grooves 2. Therefore, an outer diameter of the optical fiber cable 1 can be made smaller than that of the optical fiber cable 21 in which the non-intermittent optical fiber ribbons 20 are used even when the numbers of the optical fiber ribbons are the same, and the increase in flexural rigidity of the optical fiber cable can be further suppressed.

DESCRIPTION OF REFERENCE NUMERALS

1, 21 optical fiber cable
2 slot groove
3 slot rod
4 tension member
5 cable sheath
10 intermittent-connection-type optical fiber ribbon
11A to 11L optical fiber core wire
12 connecting part
13 non-connecting part
20 non-intermittent optical fiber ribbon

The invention claimed is:

1. An optical fiber cable comprising:
   a plurality of optical fiber ribbons of no less than twelve optical fiber core wires;
   a slot rod that includes a plurality of slot grooves in which the plurality of optical fiber ribbons are housed;
   a tension member that is provided inside the slot rod; and
   a cable sheath that covers outside the slot rod,
   wherein the optical fiber ribbons include, at a part of or through all of the plurality of optical fiber core wires, in a state where the plurality of optical fiber core wires are arranged in parallel, a connecting part where adjacent optical fiber core wires are connected to each other and a non-connecting part where adjacent optical fiber core wires are not connected to each other, the connecting part and the non-connecting part being provided intermittently in a longitudinal direction, and
   wherein a relationship between the number "x" of the optical fiber core wires housed in the optical fiber cable and flexural rigidity "y" (N·mm$^2$) of the optical fiber cable satisfies following Expression 1

$$y \leq 3e^{0.0006x} \quad \text{(Expression 1).}$$

* * * * *